(12) United States Patent
Gade et al.

(10) Patent No.: US 6,721,610 B2
(45) Date of Patent: Apr. 13, 2004

(54) UNIVERSAL METHOD FOR PRE-CALCULATING PARAMETERS OF INDUSTRIAL PROCESSES

(75) Inventors: Dirk Gade, Erlangen (DE); Thomas Peuker, Baiersdorf-Hagenau (DE)

(73) Assignee: Siemens Aktiengesellschaft, Munich (DE)

( * ) Notice: Subject to any disclaimer, the term of this patent is extended or adjusted under 35 U.S.C. 154(b) by 0 days.

(21) Appl. No.: 10/329,644

(22) Filed: Dec. 26, 2002

(65) Prior Publication Data

US 2003/0097194 A1 May 22, 2003

Related U.S. Application Data

(63) Continuation of application No. PCT/DE01/02288, filed on Jun. 20, 2001.

(30) Foreign Application Priority Data

Jun. 26, 2000 (DE) .......................... 100 31 060
Jul. 27, 2000 (DE) .......................... 100 36 717

(51) Int. Cl.⁷ ............................................. G05B 13/02
(52) U.S. Cl. ............................ 700/52; 700/28; 700/44; 700/150
(58) Field of Search ........................... 700/28, 44, 45, 700/52, 150

(56) References Cited

U.S. PATENT DOCUMENTS

| | | | |
|---|---|---|---|
| 5,519,605 A | 5/1996 | Cawlfield | .................. 364/151 |
| 5,825,645 A | 10/1998 | Konar et al. | ................. 364/148 |
| 6,026,334 A | 2/2000 | Kayihan et al. | ............... 700/28 |
| 6,056,781 A | 5/2000 | Wassick et al. | ............... 703/12 |
| 6,064,916 A | 5/2000 | Yoon | ........................... 700/44 |

FOREIGN PATENT DOCUMENTS

| | | | | |
|---|---|---|---|---|
| EP | 0 196 259 | | 10/1986 | ............ B01J/19/00 |
| EP | 0 524 317 A1 | | 1/1993 | ............ G05B/13/04 |
| WO | 00/33209 | | 6/2000 | ............ G06F/17/00 |

OTHER PUBLICATIONS

International Search Report PCT/DE 01/02288, Mailed Oct. 16, 2001.

PCT Written Examination Report PCT/DE 01/02288, Mailed May 17, 2002.

*Primary Examiner*—Emanuel Todd Voeltz
(74) *Attorney, Agent, or Firm*—Baker Botts L.L.P.

(57) ABSTRACT

The invention relates to a method for pre-calculating the parameters of industrial processes. According to said method, an admissible process input variable vector is determined with definition ranges allocated to each variable and a process output variable vector is determined with the pre-calculable process parameters. Known information on the process is stored in a data bank and ranges of validity for the process input variables are allocated to said information. For each process input vector inputted from an admissible definition range provided with valid information, exactly one process output vector is determined according to the information valid therefor.

22 Claims, 3 Drawing Sheets

UNIVERSAL METHOD FOR PRE-CALCULATING PARAMETERS OF INDUSTRIAL PROCESSES

CROSS-REFERENCE TO RELATED APPLICATIONS

This application is a continuation of co-pending International Application No. PCT/DE01/02288 filed Jun. 20, 2001, which designates the United States, and claims priority to German application number DE10031060.5 filed Jun. 26, 2000 and German application number DE10036717.8 filed Jul. 27, 2000.

TECHNICAL FIELD OF THE INVENTION

The invention relates to a universal method for pre-calculating or estimating parameters of industrial processes.

BACKGROUND OF THE INVENTION

Bigger, faster, better—these keywords characterize the development toward ever more efficient industrial plants. By contrast with the widespread mass production of consumer articles, large-scale plants to be newly set up are therefore often unprecedented, so that it is scarcely possible to resort to valid empirical values during the project planning, or during the first-time commissioning of such plants. One of the reasons for this is that, by contrast with small devices, large-scale plants of this type can only be modeled inadequately in laboratory tests and therefore can only be tested to a restricted extent. On the other hand, in the chemical industry and in the iron and steel industry new developments of improved materials are constantly taking place, materials which are not even known at the time when a plant is commissioned. Nevertheless, a plant is intended to be suitable also for processing materials of this type with still unknown properties, so that the high plant costs can be distributed over an adequate operating time period. For this application, the pre-estimation of properties, such as for example heat capacity, toughness, solidifying temperature, etc., of materials to be developed in the future is even required. Since, in steel production alone, a very wide variety of properties can be produced by admixing over 20 different alloying elements, in such an estimate of the chemical and physical properties of future steel alloys or other mixed materials "plain common sense", which at the present time is the only cost-effective means of calculation available when extrapolating known material properties onto previously unknown products, is found to be completely inadequate because of the no longer comprehensible interrelationships. One of the reasons for this is that the information necessary for such a pre-estimate is usually scattered among many people and industrial enterprises and, on account of its volume, cannot be unified in a single person, even if this person had access to a large proportion of the information available, for example by way of patent specifications.

These disadvantages of the known prior art result in the problem initiating the invention, that of providing a method for pre-calculating or estimating parameters of industrial processes which, given access to a large volume of information, is rendered capable of determining the desired parameters in advance with greatest possible accuracy.

SUMMARY OF THE INVENTION

The solution to this problem is achieved by defining for a specialist technical field, for example the iron and steel industry, a vector of admissible input variables of an industrial process and/or product (hereafter: process input variables), with definition ranges assigned to each variable, and a vector of output variables to be determined of the industrial process and/or product (hereafter: process output variables), with the pre-calculable process and/or product parameters, known information on the process and/or the product being stored in a databank and this information being allocated ranges of validity for the process input variables, and exactly one process output vector being determined according to the information valid for it with respect to each input process input vector from a definition range which is admissible and provided with valid information.

A first step on the way toward solving the extremely extensive problem is a subdivision into specialist technical areas with expert knowledge that in each case is largely self-contained. For example, the processes in steel production can be largely detached from other chemical processes, since any combinations of such plants there may be are confined to auxiliary equipment for supporting the iron and steel industry. Then, in a further step, the input variables of the processes to be considered, which can be directly influenced externally, such as in particular the composition of a grade of steel, its current temperature, and, if appropriate, specific process steps of the production process, are distinguished from the output variables of the process, which although influenced by these factors are initially unknown, such as for example the chemical, physical and mechanical properties of the products produced by the working or processing, for example of new steel alloys. If further information on dependencies of the process output variables of less interesting state variables are known, for example of the density, additional state variables can be defined, the actual knowledge of which may be of no interest to the user but is indispensable for determining the desired output variables. Consequently, once the basic structure of the process to be considered has been defined in the form of its input variables, output variables and, if appropriate, state variables, in a further step the knowledge available on the internal interrelationships between these variables is brought together and stored in a databank. Owing to the wide diversity, for example of alloying elements which can be used in the iron and steel industry and of any additional process parameters, the available knowledge in virtually all applications will have to be classified as extremely sketchy, the knowledge of particularly frequent process parameters being more complete, the knowledge of exotic, and therefore rare, combinations of input variables being less complete. Accordingly, the accuracy of a prediction in the areas commonly used by technology will be significantly higher than in the areas where new technical territory is being entered. Nevertheless, even in the case of common processes, the interrelationship between output variables and input variables is likely to be known only for individual, specific process parameters, unless the chemical process concerned has been scientifically investigated completely and can be modeled with a closed system of equations. Such comprehensive information, as in the meantime achieved for example in the electrical drive sector, is nothing but a dream for the experts in other branches of industry. This is where the invention comes in, in that it uses the sketchy, but known information to provide an estimate of the output variables by interpolation for every conceivable application, as far as possible, i.e. combinations of input parameters, a constant motivation to optimize the method according to the invention being perceived in the endeavor to reduce the deviations of the parameters to be pre-calculated from the actual parameters to zero by an ongoing process of completing the data available. This can take place, for example, in the case of fields that are being newly worked and not yet fully understood scientifically, by the available information being stored in the form of measured values, it then being intended in the case of an inquiry concerning intermediate products for best possible interpolation to be performed between known values; as the information becomes increasingly complete, instead of individual measured points it is possible for example to store regression curves, which—even without full scientific understanding—permit a good approximation of the pre-estimate, and finally, after scientific study of the interrelationships, the functions found thereby can be programmed in, so that, over time, the precision of the method according to the invention asymptotically approaches the ideal of an error-free prediction of parameters of technically not yet realized processes. This capability of the method according to the invention of learning by adding to the databank, in order in this way constantly to increase its knowledge base, can be used to provide the user not only with the pre-calculated and/or estimated parameters but also with the degree of completeness of the knowledge required for this, or, derived from this, an estimate of the possible errors in calculation or estimation. If, in this case, calculation is then carried out with the "worst case" to be assumed for the respective application, the user will always be on the safe side, for example when dimensioning a plant to be newly set up, so that the technical aging of such a plant can be slowed.

It has proven to be favorable for information on educts, in particular raw materials and/or products, and also boundary conditions of the processing process to be used as process input variables. Since, in the case of industrial processes, processing of one or more educts to form intermediate or end products usually takes place, it is appropriate to use in particular the known properties of the raw materials which can be used, and also the process parameters which can be externally controlled, as directly influenceable variables.

It is within the scope of the invention that the process output variables contain information on products obtained by the process, for example their chemical, physical or mechanical properties, and also, if appropriate, information on process state variables. For designing a plant, chemical, physical and mechanical properties of the intermediate and end products in particular are then of interest, it being possible for these properties to be dependent on the temperature or further boundary conditions. While in this respect those properties which concern the interaction with external variables may be important in particular, for example the chemical aggressiveness, the current and heat conductivity, etc., further properties which scarcely manifest themselves during the process may nevertheless be of significance for the determination of the relevant output variables; of these, internal properties such as density or the like may be mentioned by way of example.

In the case of an n-dimensional definition space for the process input vectors and an m-dimensional value space for the process output vectors, it is possible for the information on the process to be stored as at least (n+1)-dimensional information vectors with a complete input vector and a value measured thereby of at least one output variable. Information vectors of this type only have an information content which can be used within the scope of the method according to the invention when, with full knowledge of the input variables, they additionally specify at least also one output variable, so that by corresponding pre-selection of the input variables the known output variable can be set. On the other hand, in the case of a specific input vector, all the output variables may have been measured and stored in the databank according to the invention, so that, as a maximum, the dimension (n+m) is obtained for a valid information vector. Within the scope of the method according to the invention, information vectors can be readily processed with different information, so that a more accurate calculation is possible with regard to some output variables, while only a rough estimate is possible in the case of other output variables. The dimension of the information vectors is respectively based on the knowledge which is accessible and can be stored in a databank. Since in this respect the specification takes place simply by inputting the set and measured values, no knowledge of the basic behavior of the system is necessary for this. Consequently, any type of knowledge of the output variables can be exploited within the scope of the method according to the invention, provided that, in addition, the input variables pre-selected thereby are sufficiently known.

Further advantages are obtained if the output variables with respect to a given process input vector are calculated by interpolation from information vectors with definition ranges valid for the input vector. The pre-selection of valid definition ranges in which an information vector should still be usable is of great significance for the method according to the invention. It is characteristic of material sciences that, at specific range limits, the structures of a material or process change fundamentally, for example in the iron-cementite diagram enclosed in FIG. 1, which is typical of steels, it is possible to define a liquidus line ABCD, which separates the substance present as pure melt at high temperatures from the mixed form of melt and crystals present thereunder, and it is also possible to enter what is known as the solidus line AECF, below which the substance is present in a solidified state. At these lines, the substance specified by its composition changes its state of aggregation, and consequently a whole series of its physical properties as well, such as for example tensile and compressive strength, when there is a change in temperature. On the other hand, for example, in range 2 of the equilibrium diagram 1 α-ferrite is predominant, where the iron lattice is in the form of body-centered cubic α-mixed crystals and the carbon atoms have largely been displaced from the iron lattice, while in the partly adjacent range 3 the austenitic phase exists in the form of δ-mixed crystals with a face-centred cubic iron lattice, and so on. It is evident from this that formulae which for example characterize mechanical or magnetic properties lose their validity at certain range limits, since the structure of the material concerned then changes fundamentally. For this reason, it is important to define for each information vector a range of validity, within which the statements made on the basis of this information vector on the interrelationships between input and output variables can in principle still be used, and from where use of the information concerned would lead to completely incorrect results. It follows from this that, in the determination of the output variables for given input variables, it must initially be established which information is valid at all for the composition, temperature, etc. concerned, and which information is no longer relevant in this respect. Then, with the information classified as valid, an approximation can be determined for the behavior of the output variables in the case of the given input variables.

The invention further provides that, in the interpolation, the output variables with respect to a given process input vector are calculated by weighted addition of the mutually corresponding output variables of information vectors with definition ranges valid for the input vector. The superposing of the information classified as valid can take place on the basis of various methods of interpolation. Although spline interpolations are also conceivable, for example, in many of the applications it is likely on account of the virtually arbitrary variation of the known information vectors that an interpolation of a higher order to produce regression formulae which correspond to a hypersurface passing through the end points of all the known information vectors would make little sense, or would mean an immense effort in comparison with the accuracy achievable with it. Instead, a linear interpolation would appear to be more sensible, the method of least squares or the like being suitable for example.

It has proven to be successful to normalize the weighting factors for the determination of an output variable in such a way that the sum of all the weighting factors for the calculation of an output variable is equal to 1. By normalizing in this way, it is ensured that constant output variables, i.e. variables on which one or more of the input variables have no influence, are reproduced unfalsified by the interpolation.

The invention can be developed to the extent that, in the interpolation, the distances of the information vectors in the n-dimensional definition space for the process input vectors are used in the forming of the weighting factors for the output variables of the information vector concerned. This allows a specific combination to be formed from the valid information vectors for each input vector, a combination which is not dependent on the absolute position of the input vector but on its relative position with respect to the information vectors projected onto the n-dimensional definition space. Consequently, the influence of individual information vectors can be individually adapted to the respective input vector.

In the interpolation, good results can be achieved if the weighting factors become smaller as the distance of an information vector from the input vector in the n-dimensional definition space increases. This measure ensures that those information vectors of which the projection onto the n-dimensional definition space lies closest to the current input vector exert the greatest influence on the calculation or estimate of the output variables.

A modified embodiment of the method according to the invention is characterized in that the information on the process is stored as functions of the input vector and, if appropriate, of an internal state vector that are specific for the output variables. This representation of information opens up the possibility when the information is becoming increasingly complete of performing a pre-processing operation which corresponds to a compression of the set of data, with which it is no longer a multiplicity of information vectors that are stored but one or more functions derived from them, which then offer the additional advantage of accelerated calculation of the output variables.

In the scope of this embodiment, it is provided that the functions are formed by regression formulae from known information vectors. This is the simplest method of generating functions for the output variables, which can be carried out on the basis of mathematical laws by a correspondingly programmed data-processing system entirely without external intervention, if it has been established, for example on the basis of an automatic check, that the density of the information vectors in a specific range has exceeded a predetermined value. A linear or polynomial regression with determination of the regression coefficients in dependence on one or more or all of the input variables can be performed here. Before the input variables are entered in the regression formulae, the assigned value of the output variable can be calculated immediately in the evaluation of said formula; otherwise, when evaluating a regression formula it is possible at most to determine an approximation value for the output variable concerned, which can subsequently be corrected by an interpolation by means of information vectors which are linearly independent of that subspace of the definition space for which the regression formula is valid. The temperature dependence of one or more properties of a substance, for example, is often determined by a relatively large number of measuring points, and, instead of this large number of measuring points, a temperature-dependent regression formula may be used in each case for the property concerned of the otherwise unchanged substance. From this regression formula, the output variable concerned at the given temperature can then be estimated for a substance which is as similar as possible to the material to be checked. The influence of additional alloying elements can then be taken into consideration by interpolation of this value with measured values determined for the substances.

The method according to the invention can undergo further optimization, in that the functions are arranged in a matrix form which has up to m rows and up to (n+z) columns, z being the dimension of the state vector defined for the process.

This mathematical procedure is based on the recognition that the output variables are uniquely predetermined by the input variables and also by all the state variables of the process considered. Furthermore, the invention makes use here of the possibility of a linearization of dependencies which in practice are very much non-linear, which can be realized for example by coefficients of this matrix that are dependent on various parameters. In this case, the number of columns of this matrix may vary, depending on whether the state vectors occur simultaneously as output vectors, whereby the number of columns can as a maximum be made equal to n, or whether the state variables are implicitly calculated, but do not constitute part of the output vector, whereby the number of columns can increase to the maximum of (n+z).

The invention allows a reduction in the calculating effort, in that the output vector or elements of the same is/are calculated by multiplication of the function matrix by a vector formed from input and state variables. As a result, with systematic linearization of the overall process behavior, an extremely simple calculation method can be created, the output vector in the ideal case being determinable by a single matrix multiplication. Often, linearization of this type can also be achieved by introducing additional state variables.

The invention can be developed to the extent that the calculation of the state variables is performed before the calculation of process parameters dependent on it. In this respect, the differential equation of state $$dc(t)/dt = A*c(t) + B*x(t); \tag{I}$$

can take place before the resolving of the output equation $$y(t) = C*c(t) + D*x(t); \tag{II}$$

In most cases, the dynamics of the transition from one process state into another is not of interest, so that the determination of the state variables can be greater simplified by the further assumption that $dc/dt=0$; $dx/dt=0$:

$$c = -A^{-1}*B*x; \tag{III}$$

$$y = C*c + D*x; \tag{IV}$$

where $$x=[Z,H,A]^T$$

and

Z:=composition parameters

H:=structure-determining pre-history, e.g. mechanical forming parameters, temperature control A:=operating-point-determining variables, e.g. temperature, mechanical forming parameters The user-friendliness can be further increased by the process information for various state variables and/or output parameters being stored differently, i.e. as information vectors on the one hand and as functions, in particular regression formulae, on the other hand. The methods of calculation for different output variables may be completely different from one another with an identical set of input variables, for example for one output variable a complete calculation formula, taking all the input variables into consideration, may be specified, while other output variables are represented only by the individual measured points on account of a less complete information density, so that here an interpolation is to be performed from case to case.

A clear databank structure can be achieved if the calculation rules for state variables and/or process parameters are stored in tables, the elements of which contain references to further tables, so that a relational table structure is obtained. This calculation structure allows a procedure which is as economic as possible in its calculating time to be used for the determination of variables that are dependent on one another.

An increase in the functionality of the method according to the invention is possible by performing a selection in dependence on one or more state variables between calculation information that is valid for them, in particular in the form of tables or calculation formulae. As already stated above, at specific range limits, in particular phase transformation temperatures, structural changes in the behavior of a substance occur, whereby specific calculation formulae lose their validity and have to be replaced by others. If in this case, for example, the temperature is recorded as a state variable, it is possible to switch over between various calculation formulae, tables or the like according to the transformation temperatures calculated for the substance concerned.

The avoidance of major deviations of a calculated parameter from the ideal value is served by a development of the invention according to which a steady transition takes place at the limits between the ranges of validity of different calculation information, the results of the calculations being provided with a weighting in accordance with the calculation information valid in the neighboring ranges. This method of approximation may lead to an improvement in the accuracy of prediction, in particular in the case of those input variables which are very remote from all the known information vectors and, in particular, remote from ranges where these vectors occur in high density. Therefore, the assignment to a calculation range where the formulae or information are so remote that they have lost significantly in pregnancy may lead here to great deviations, while the assignment to another range, where the core of high-density information is likewise remote, may lead to different, but likewise very imprecise, results. By superposing two or more calculation results of this type, the same can either be confirmed reciprocally or be put in relative terms and regulated by interpolative determination of an average value. For such interpolation, range limits at which no abrupt change in the behavior of a substance is evident, for example general changes in the composition, are to be used exclusively, while for example temperature limits at which phase transformations take place must also be modeled by an abrupt transition from one method of calculation to another.

In the scope of such result correction, it may further be provided that the weighting of the various calculation results is performed on the basis of association functions, which in the core range of the calculation information concerned are equal to 1 and, outside the surrounding transitional ranges, are equal to 0 and in the transitional ranges assume values between 0 and 1. These association functions may be interpreted in a way similar to the weighting factors of a numerical interpolation, in that the results determined for the formulae valid for the core ranges concerned are multiplied by the association function dependent on the position of the input vector. The fact that the core ranges of different calculation formulae preferably exclude one another means that for each core range only the association function assigned to the valid calculation formulae is equal to 1, all the others are 0 there, so that the remaining calculation formulae have no influence on the overall result. In the transitional ranges, on the other hand, a number of association functions are unequal to 0 and preferably also unequal to 1, so that all the calculation formulae concerned play a part in producing the overall result. If in this case it is ensured that the sum of all the association functions is always equal to 1 in the case of every point of a transitional range, a normalization simultaneously takes place, leading to the effect that, in the ideal case where two or more calculation formulae valid here provide the same result, the overall result also assumes this confirmed value.

A precaution for avoiding miscalculations is that the calculated output variables are subjected to a plausibility check. Given a precise input of known calculation formulae and definition ranges respectively valid for them, the probability of a prediction error is extremely low; on the other hand, with the information vector density becoming less concentrated, it is possible by a general interpolation to calculate a result deviating considerably from the actual value without this being noticed immediately because of the very complex interrelationships. Therefore, the invention provides a downstream plausibility check, where generally valid knowledge and/or empirical values have to be verified before the calculated result can be presented to the user. If a plausibility check is not passed by a calculation result, this can, if appropriate, be indicated together with the incorrect result, or it is attempted within the scope of the method to trace back the result deviating from the empirical values to its cause and, for example, to point out erroneously input information vectors or the like.

The invention is further distinguished by a data exchange with connected hardware and/or software modules. The method according to the invention can be used both as a stand-alone information databank, in that a user formulates a question to the databank by specifying input parameters, for example with the assistance of a screen and a keyboard, and the response is printed out on a printer in the form of the calculation result. On the other hand, a software module operating on the basis of the method according to the invention may also be used in the scope of simulation programs as a data supplier for specific parameters, which are then used by the simulation program at the given location in order to optimize the simulation results. In addition, it is also possible in the case of online feedback controls to define internal, non-measurable variables as state variables; if the same cannot be determined by a simple calculation model, the expert system according to the invention can provide good services for the estimation of the current state parameters on the basis of the known input variables. In this case, a constant data exchange takes place between the control device and the expert system according to the invention, the latter receiving input and state variables pre-selected by means of controls and/or determined by means of sensors and determining from these the information required and in turn transmitting this information to the control circuit for optimizing the control characteristics.

Finally, it corresponds to the teaching of the invention that the data stored and/or to be transferred is at least partially encrypted. Since the expert system according to the invention unifies immense knowledge within itself, it could be misused by rival enterprises for any number of different purposes. Because of the capabilities covering entire specialist areas, the applications are virtually unlimited. On the other hand, uncritical use of the method, for example unverified results, may also cause great damage or loss to ensue. Therefore, it is provided according to the invention that the expert system exchanges data with peripheral devices only in a controlled form, the encryption and decryption only taking place in the peripheral devices. To increase security, it may also be provided that a data exchange only takes place in the first place if a defined activation code has been sent by a connected device or software module.

BRIEF DESCRIPTION OF THE FIGURES

Further features, details, advantages and effects based on the invention emerge from the following description of a preferred exemplary embodiment of the invention and also on the basis of the drawing, in which.

DETAILED DESCRIPTION OF THE PREFERRED EMBODIMENTS OF THE INVENTION

Figure 1:
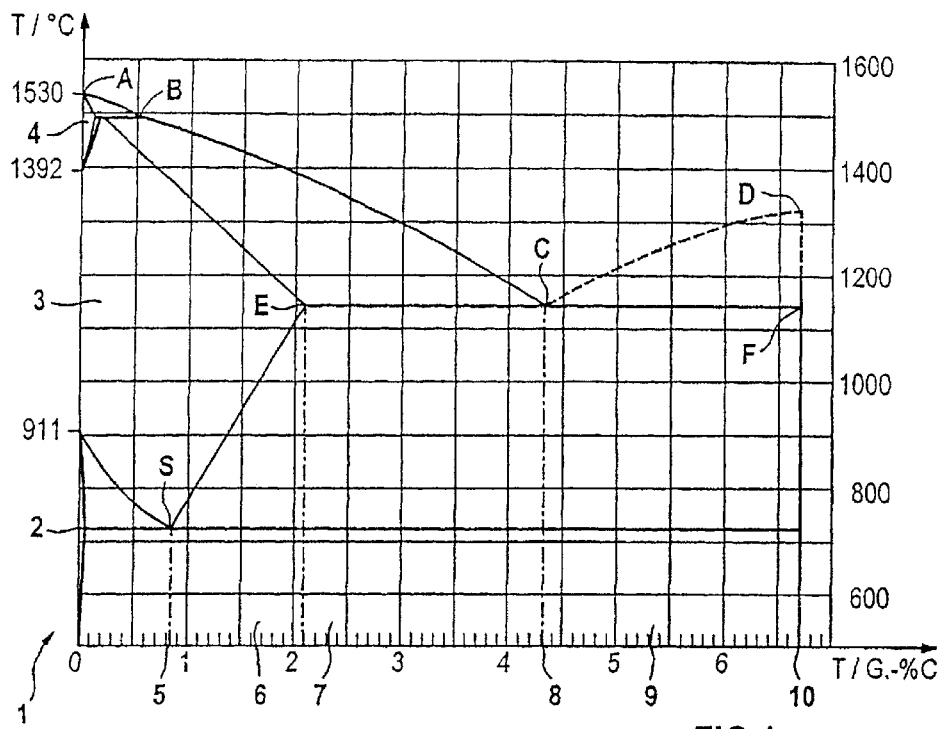
FIG. 1 shows a simplified example of a definition range of admissible input vectors.

The known iron-carbon equilibrium diagram reproduced in FIG. 1 for the metastable cementite state, especially frequent in the case of steels, is intended to serve only by way of example for explaining the different states of which a material system comprising a number of components is capable:

On the one hand, dependent on the temperature, different crystal states already exist in the solid state of aggregation for the unalloyed iron-steel, α-ferrite below 911° C., austenite up to a temperature of 1392° C., and δ-ferrite above that, up to the melting point of 1530° C.

In addition, with an increasing proportion by weight of the carbon, on the one hand the melting temperature drops to 1147° C. at the point C, on the other hand the overall microstructure also changes via the perlite 5 over one mixing phase 6, 7 to the ledeburite 8 and over a further mixing phase 9 up to the pure cementite 10. While in the range from the unalloyed steel up to the perlite 5 there may still be α-ferrite crystals present, the range between perlite 5 and ledeburite 8 is distinguished by the fact that, depending on the temperature, austenite crystals may still be present here, while in the hypereutectoid range between ledeburite 8 and pure cementite 10 no pure iron crystals exist any longer, but exclusively a granular structure of primary cementite and ledeburite. These substances differ considerably with regard to their chemical, physical and materials-scientific properties, for example hypereutectoid materials are technologically of lesser significance.

In the case of FIG. 1, the variable composition Z plotted along the x-axis is to be interpreted as representative of the composition range of a wide variety of alloying substances that is multidimensional in practice, while the temperature T plotted along the y-axis is representative of parameters A which are independent of the composition Z and likewise have an influence on the current state (operating point) of a material. Further parameters of this type could be: structure-determining pre-history H, in particular heat treatment such as annealing, tempering, etc. as well as rolling operations, and surface treatments, such as for example pickling, but additionally also current parameters, such as for example the pressure bearing on the melt or the like. The large number of composition, pretreatment and current parameters, which all have an influence on the actual behavior of specific chemical, physical or materials-scientific variables (output variables), can be combined as a vector [Z, H, A] of the input variables.

Figure 2:
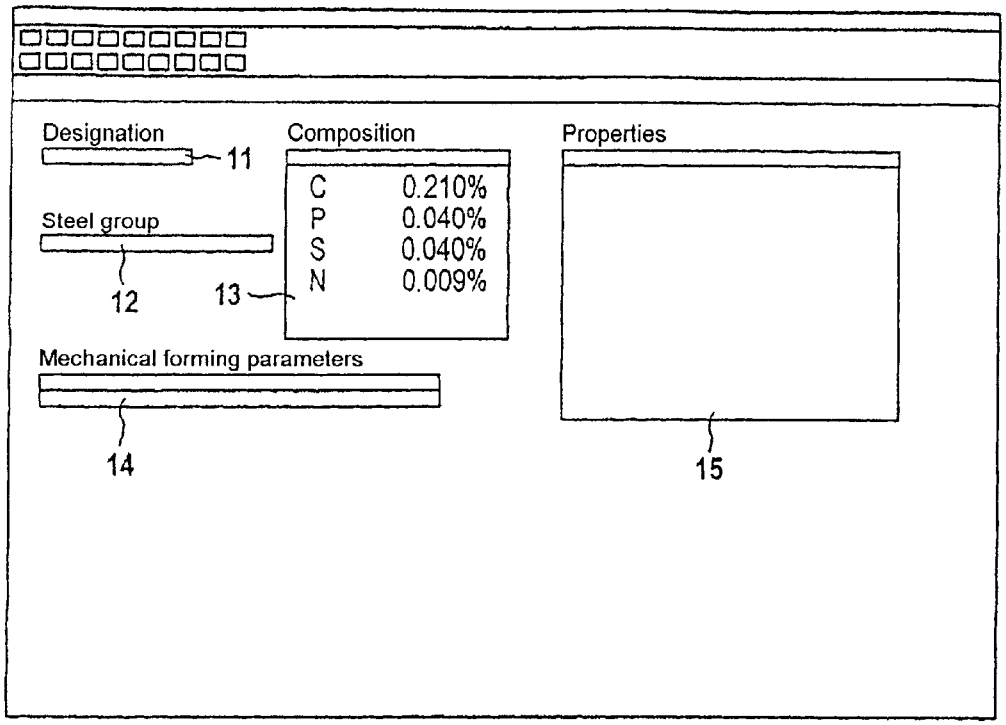
FIG. 2 shows an overview of the data structure in the management of the databank assisting the method according to the invention.

This can be illustrated for example by the following vector (table 2), combining 24 alloying constituents which, together with the main alloying constituent Fe, define the composition of the steel concerned. Given the input of corresponding information on the behavior of such a material, this composition can be input into a databank on the basis of the screen display according to FIG. 2:

After specifying the material in the window 11—"designation", for example by allocating a consecutive number, such as for example "St44", and assignment to a material group, in particular a steel group, from the following table 1,

TABLE 1

Steel groups

| ID | Steel group |
|---|---|
| 0 | unknown |
| 1 | general constructional steels and heat-treatment steels |
| 2 | high-grade steels and deep drawing steels |
| 3 | microalloyed higher-strength constructional steels and steels for large pipes |
| 4 | spring band steels |
| 5 | tool steels for metal sheets and strips |
| 6 | ferritic, ferritic-perlitic chromium steels and heat-resistant steels |
| 7 | austenitic chromium-nickel steels |
| 8 | ferritic-austenitic chromium-nickel steels |
| 9 | martensitic steels |
| 10 | transformer and dynamo strip steels | according to window 12, the input of information on the steel 11 takes place. Firstly, for this purpose, the input variables which together form the input vector are specified. This takes place, on the one hand, via the window 13—"Composition", where the alloying fractions Z according to the component vector are specifically indicated on the basis of table 2.

TABLE 2

Alloying elements

| ID | Component |
|---|---|
| 1 | C |
| 2 | Si |
| 3 | Mn |
| 4 | P |
| 5 | S |
| 6 | Cr |
| 7 | Ni |
| 8 | Mo |
| 9 | V |
| 10 | Nb |
| 11 | Al |
| 12 | Ti |
| 13 | Co |
| 14 | Cu |
| 15 | N |
| 16 | B |
| 17 | Sn |
| 18 | Pb |
| 19 | W |
| 20 | Zr |
| 21 | Ce |
| 22 | O |
| 23 | As |
| 24 | Ca |

Further input variables are the production pre-history, in part the structure-determining pre-history H, which are to be specified in the window 14, for example information on annealing and rolling operations, such as for example the heating-up temperature, initial rolling temperature, finished strip temperature, coiling temperature, and also, if appropriate, further information on surface treatments or the like.

If the input variable is determined in such a way with the exception of the temperature T, it is then possible to input in the window 15 measured values obtained for a given temperature T, for example material data according to the following Table 3.

TABLE 3

Material-specific data

| ID variable | Variable | Unit |
|---|---|---|
| A | elongation at break | % |
| β | coefficient of linear expansion | 1/K |
| HB30 | hardness | — |
| n | n value | — |
| $\varphi_{crit}$ | critical logarithmic forming degree at the beginning of recrystallization | — |
| $Q_{rec,dyn}$ | activation energy (dynamic recrystallization) | kJ/mol |
| $Q_{rec,stat}$ | activation energy (static recrystallization) | kJ/mol |
| $Q_{rec,G}$ | activation energy (grain growth) | kJ/mol |
| R | r value | — |
| $R_e$ | yield strength | MPa |
| $R_m$ | tensile strength | MPa |

TABLE 3-continued

Material-specific data

| ID variable | Variable | Unit |
|---|---|---|
| $W_k$ | notched bar impact work | J |

In this case, further material parameters which show temperature dependency are also important, for example the differential coefficient of linear expansion, which can subsequently be viewed in a graph 16, as well as the specific heat capacity 17, the temperature-dependent modulus of elasticity 18, the heat conductivity 19 and the likewise temperature-dependent density 20. For a possibility check of all the input material parameters 15, curve-like representations of this information 16–20 can subsequently be used for visual feedback.

The input information may be understood as information vectors which are formed in each case by a value of the input variables—composition Z (25 alloying constituents), mechanical forming parameters H, (for example 4 variables: heating-up temperature, initial rolling temperature, finished strip temperature, coiling temperature) and the temperature T (ϵ A) (accordingly, 30 parameters in the present case), while each input vector of this type is assigned exactly one value of the output variables 16 to 20 (5 variables) or further variables, for example according to table 3 (12 variables) and, if appropriate, additional variables, for example the flow stress. In the present example, each information vector would accordingly have 30 input variables and, for example, 18 output variables. On the other hand, there does not have to be a complete set of output variables for every set of input variables $[Z, H, A]^T$; rather, an information vector is already meaningful if only a single output variable is specified.

Figure 4:
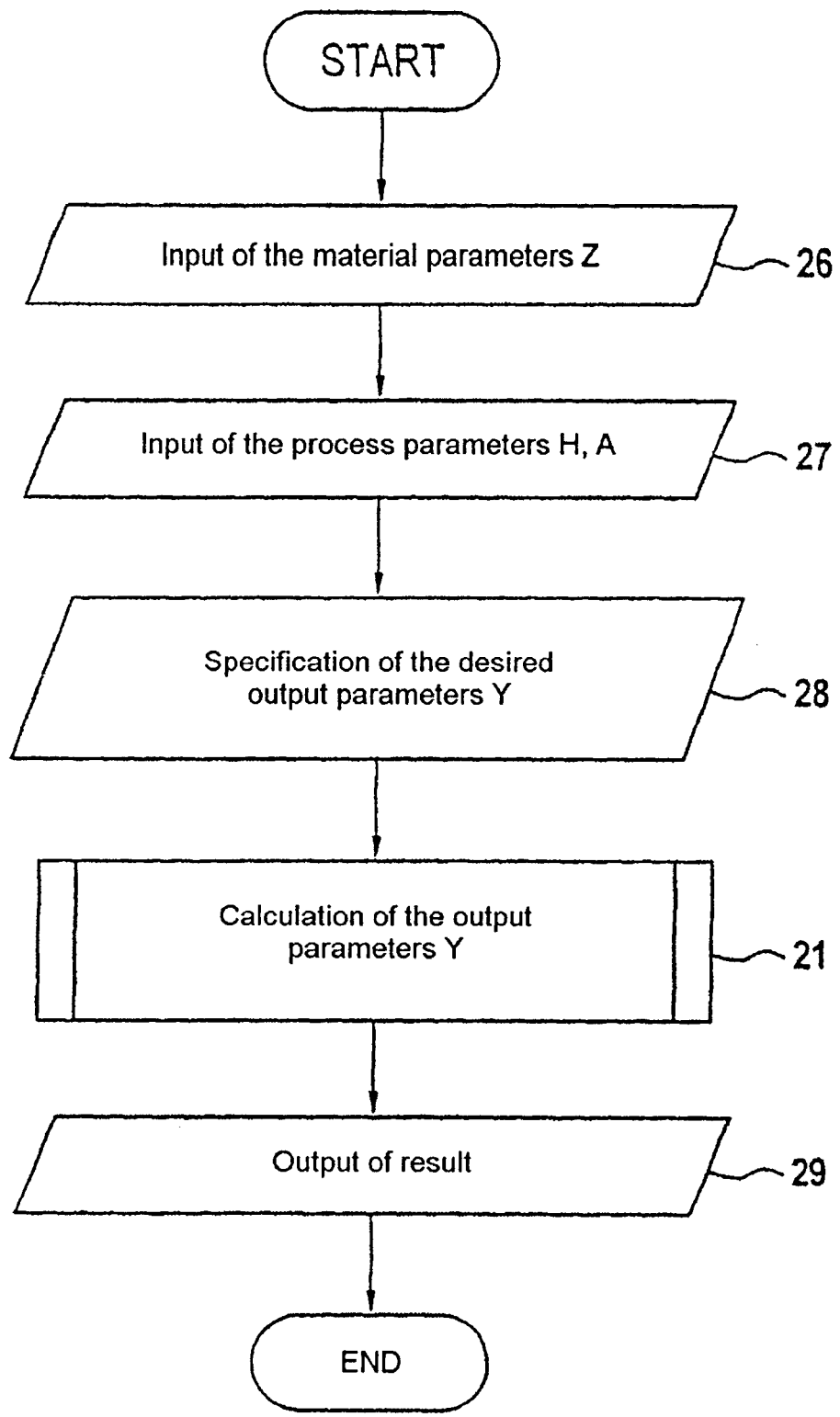
FIG. 4 shows a structogram of the calculation method according to the invention.

Once all the known information of this kind has been input in the form of such information vectors into the databank according to the invention, it is possible in principle with the method 21 according to FIG. 4 to begin the determination of the desired output variables from a set of input variables and the input data. For this purpose, an interpolation is almost always required if it is not possible to find for a predetermined input vector $[Z, H, A]^T$ an information vector for which the projection onto the definition space of the input variables coincides with the input vector $[Z, H, A]^T$. However, for the interpolation which is almost always required in this way, further information on the ranges of validity of individual information vectors is necessary; for example, certain output variables such as the tensile strength lose their significance when the melting temperature is exceeded and, instead of a further extrapolation of known values, must be set to zero. The definition of ranges of validity of this type must take place at the same time as the inputting of the information vector concerned, in order that the evaluation of the databank can subsequently proceed fully automatically.

Figure 5:
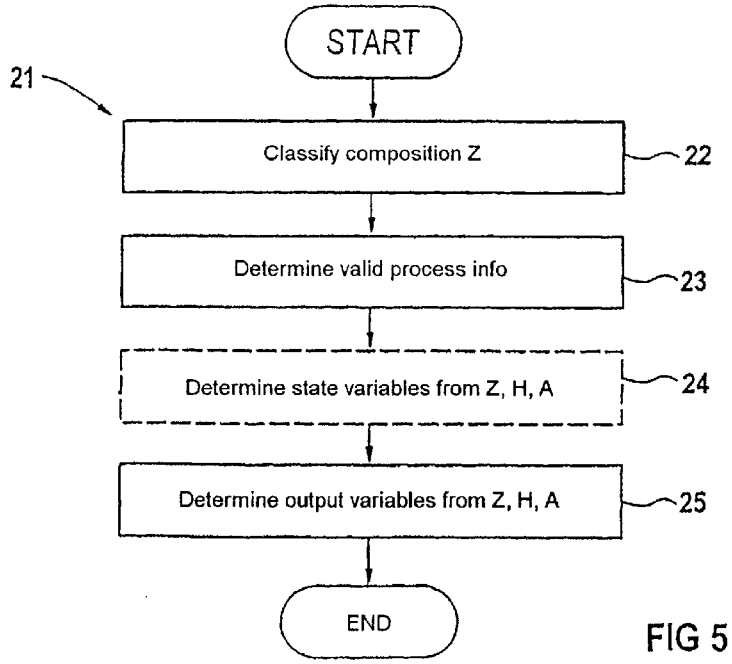
FIG. 5 shows a structogram with the steps to be performed in an application.

This evaluation method 21 begins, in the case of the exemplary embodiment represented in FIG. 5, with the currently input input vector $[Z, H, A]^T$ being classified within a first method step 22 into the material group 12 concerned, which may take place for example by a rough evaluation of the alloying components Z. Then, the data-processing system used for the evaluation finds process information valid for the material group concerned (method step 23), which in turn can be subdivided into individual ranges 2–10, for which different chemical structures and/or physical states of aggregation exist. As soon as the process information valid for the actual input vector has been found in such a way 23, initially internal state variables C are determined 24 from the composition Z and the temperature T ($\epsilon$ A) and also, if appropriate, from further mechanical forming parameters H, which although not required by the user are decisive for the further calculation steps on account of material-characteristic dependencies (here the state of aggregation is important in particular; furthermore, the density is relevant for the heat conductivity, for example). This evaluation 24 may take place for example by interpolation between the corresponding parameters of input information vectors, which are in this case multiplied for example by a weighting factor dependent on the distance from the current input vector, and are then added up. From the state variables C calculated in this way and also the input variables Z, H, A, it is then possible in a subsequent method step 25 for the desired vector of the output variables Y to be determined, preferably likewise by interpolation.

Figure 3:
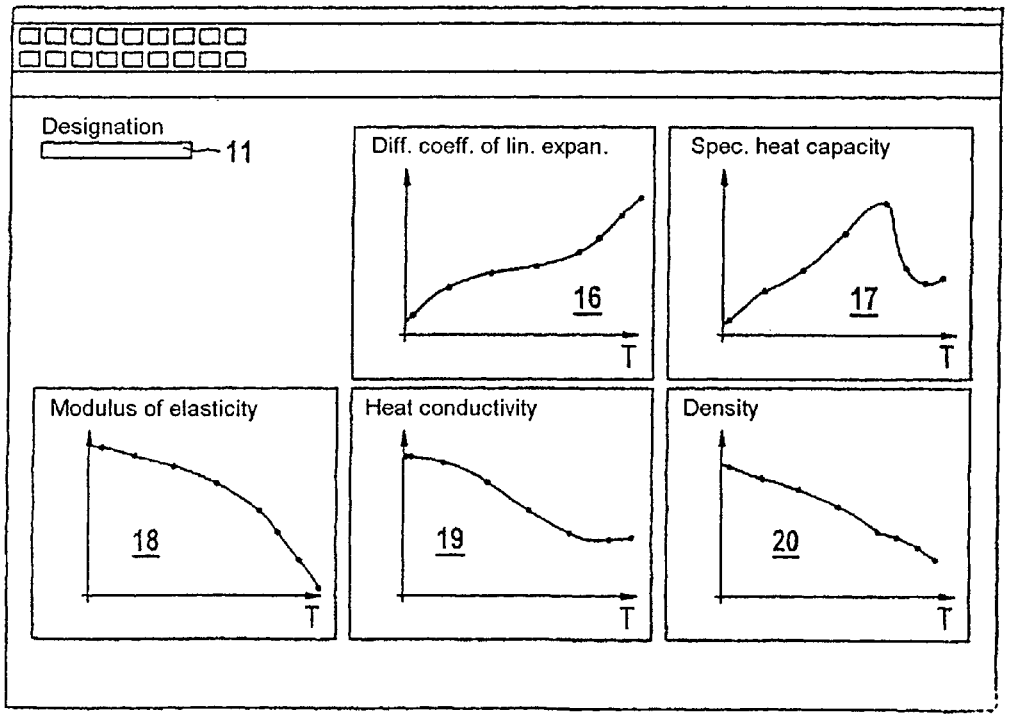
FIG. 3 shows a representation corresponding to FIG. 2 for the input and/or changing of parameter-dependent variables.

As FIG. 3 shows, it is possible, for example for temperature-dependent output variables, to form regression formulae which provide exact output values Y of specific input variables for any desired temperature values T. In such a case, the dimension of the interpolation to be performed, and consequently the calculating effort, can be reduced. If this is possible by adequate density of the information vectors in a specific composition range, these regression formulae can also be extended to a number of, or all the, input variables Z, H, A, so that in the ideal case no interpolation is required any longer for the evaluation, but instead the output variable concerned can be calculated simply by entering the known input variables into the regression formula. Instead of regression formulae, scientifically substantiated dependencies in the form of known, materials-scientific formulae can also be input.

Consequently, in the case of an application from the iron and steel industry, the method according to the invention can be applied as follows:

In a first step 26, the known material parameters Z are input, whereby the electronic data-processing system (EDP system) used here can identify the material. The specification may take place by input of the chemical components and their proportions
of the material designation, for example "st37"
or of the material group, for example "general constructional and heat-treatment steels".

If an indirect specification is given here via the material designation or even an inaccurate specification is given via the material group designation, a valid composition Z can be established by the EDP system, by using a typical representative with this designation or from this group by way of example.

In the then following step 27, the known structure-determining pre-history H is input, in particular by way of mechanical forming
temperature control and parameters A determining the current operating point, such as temperature
current forming degree in working by rolling
current forming rate, etc.

Consequently, the EDP system knows all the boundary conditions of the metallurgical process to be calculated.

To then define the task to be performed by the EDP system, it is established in the method step 28 which current parameters Y the EDP system is to calculate. Of course, the input method steps 26–28 may also be carried out in any other desired sequence.

Once this has taken place, the calculation can be started, in that the subprogram 21 is then called up. This determines the desired output variables Y as a function of the composition Z, the structure-determining pre-history H and the operating-point-determining parameters A and also, if appropriate, on the basis of state parameters which are of little interest but influence the output parameters Y, for example the current density. In this case it is possible to resort to stored sets of data, regression equations and/or neural networks; discrepancies between known information and current boundary conditions are overcome by methods of interpolation and/or extrapolation. As an aid, individual material parameters, in particular material components, can be replaced by parameters or components with similar properties, in particular effects, in order to establish relationships with known information and to arrive at meaningful results.

The 21 output parameters Y calculated in such a way are then output in the method step 29 by means of a data output device, for example a screen or printer.

What is claimed is:

1. A universal method for pre-calculating parameters of industrial processes and/or products, for a particular technical field, said method comprising: defining a vector $[Z, H, A]^T$ of admissible input variables of the industrial process and/or product , with definition ranges assigned to each variable, and defining a vector $Y^T$ of output variables of the industrial process and/or product with the pre-calculable process and/or product parameters, known information on the industrial process and/or the product being stored in a databank and this information being allocated ranges of validity for the input variables, and exactly one process output vector $Y^T$ being determined according to the information valid for it with respect to each input process input vector $[Z, H, A]^T$ from a definition range which is admissible and provided with valid information.

2. The method as claimed in claim 1, wherein the information, in particular of raw materials and/or products, and also boundary conditions (A) of the processing process determining the operating point are used as process input variables.

3. The method as claimed in claim 1 wherein the process output variables $Y^T$ contain information on products obtained by the process, for example their chemical, physical or mechanical properties.

4. The method as claimed in one of claim 1 further comprising an n-dimensional definition space for the process input vectors $[Z, H, A]^T$ and an in-dimensional value space for the process output vectors, wherein the information on the process is stored as at least (n+1)-dimensional information vectors with a complete input vector $[Z, H, A]^T$ and a value measured thereby of at least one output variable (Y).

5. The method of claim 4, wherein the output variables (Y) with respect to a given process input vector $[Z, H, A]^T$ are calculated by interpolation from information vectors with definition ranges valid for the input vector $[Z, H, A]^T$.

6. The method of claim 5, wherein the interpolation, the output variables with respect to a given process input vector $[Z, H, A]^T$ are calculated by weighted addition of the mutually corresponding output variables (Y) of information vectors with definition ranges valid for the input vector $[Z, H, A]^T$.

7. The method of claim 6, wherein the weighting factors for the determination of output variable (Y) are normalized in such a way that the sum of all the weighting factors for the calculation of an output variable (Y) is equal to 1.

8. The method of claim 6 wherein the interpolation, the distances of information vectors in the n-dimensional definition space for the process input vectors $[Z, H, A]^T$ are used in the forming of the weighting factors for the output variables (Y) of the information vector concerned.

9. The method of claim 8, wherein the weighting factors become smaller as the distance of an information vector in the n-dimensional definition space from the input vector $[Z, H, A]^T$ increases.

10. The method of claim 1 wherein the information on the process is stored as functions of the input vector $[Z, H, A]^T$ specific for the output variables.

11. The method of claim 10, wherein the functions are formed by regression formulae from known information vectors.

12. The method of claim 10 further comprising individual input and output variables (Z, H, A, Y) wherein the functions are arranged in a matrix form which has up to m rows and up to (n+z) columns, z being the dimension of a state vector defined for the process.

13. The method of claim 10 wherein the output variables [Y] are calculated in form of a vector or in form of elements by multiplication of the function matrix by a vector $[Z, H, A, C]^T$ formed from input and state variables.

14. The method of claim 13 wherein state variables and/or output variables (Y) are stored differently, i.e. as information vectors on the one hand and as functions, in particular regression formulae, on the other hand.

15. The method of claim 13 wherein calculation of the state variables is performed before calculation of process parameters (Y) dependent on it.

16. The method of claim 13 wherein calculation rules for state variables and/or process parameters are stored in tables, the elements of which contain references to further tables, so that a relational table structure is obtained.

17. The method of claim 13 wherein a selection is performed in dependence on one or more state variables between calculation information that is valid for them, in particular in the form of tables or calculation formulae.

18. The method of claim 1 wherein a steady transition takes place at limits between ranges of validity of different calculation information, the resulting output variables (Y) of the calculations in accordance with calculation information valid in neighboring ranges being provided with a weighting.

19. The method of claim 18, wherein the weighting of the various calculation results is performed on a basis of association functions, which in a core range of calculation information concerned are equal to 1 and, outside surrounding transitional ranges, are equal to 0 and in transitional ranges assume values between 0 and 1.

20. The method of claim 13 wherein the calculated output variables (Y) are subjected to a plausibility check.

21. The method of claim 1 wherein data is exchanged with connected hardware and/or software modules.

22. The method of claim 1 wherein data stored and/or to be transferred, or parts of the same, are encrypted.

* * * * *